(12) United States Patent
Van Hook

(10) Patent No.: US 6,630,933 B1
(45) Date of Patent: Oct. 7, 2003

(54) METHOD AND APPARATUS FOR COMPRESSION AND DECOMPRESSION OF Z DATA

(75) Inventor: Timothy J. Van Hook, Atherton, CA (US)

(73) Assignee: ATI Technologies Inc., Ontario (CA)

( * ) Notice: Subject to any disclaimer, the term of this patent is extended or adjusted under 35 U.S.C. 154(b) by 255 days.

(21) Appl. No.: 09/653,055

(22) Filed: Sep. 1, 2000

(51) Int. Cl.[7] .............................................. G06T 15/40
(52) U.S. Cl. ...................................... 345/422; 345/202
(58) Field of Search ................................ 345/422, 555, 345/202; 382/232–253, 166

(56) References Cited

U.S. PATENT DOCUMENTS

| | | | | |
|---|---|---|---|---|
| 5,682,441 A | * | 10/1997 | Ligtenberg et al. | ......... 382/232 |
| 6,104,837 A | * | 8/2000 | Walker | ....................... 382/239 |
| 6,252,608 B1 | * | 6/2001 | Snyder et al. | ............... 345/473 |

* cited by examiner

Primary Examiner—Mark Zimmerman
Assistant Examiner—Linzy McCartney
(74) Attorney, Agent, or Firm—J. D. Harriman II, Esq.; Coudert Brothers LLP

(57) ABSTRACT

The present invention provides a scheme for compressing the depth, or Z, components of image data. The data is grouped into a plurality of tiles. A test is performed to determine if a tile can be compressed so that its size after compression is less than its size before compression. If so, the tile is compressed. A tile table includes a flag that can be set for each tile that is compressed. In a data transfer from memory to a graphics processor, the tile table is examined to identify those tiles that are compressed and must be decompressed prior to use. In one scheme the number of primitives that are contained in a tile are determined. If the number of primitives is less than one third of the number of pixels in a tile, an assumption is made that the tile can be compressed. For example, for an 8×8 tile, if the number of primitives is equal to or less than 21, the tile is compressed. In one embodiment, the compression scheme comprises storing a plane equation for each primitive and storing the fragment ID (FID) for each pixel in a primitive.

24 Claims, 5 Drawing Sheets

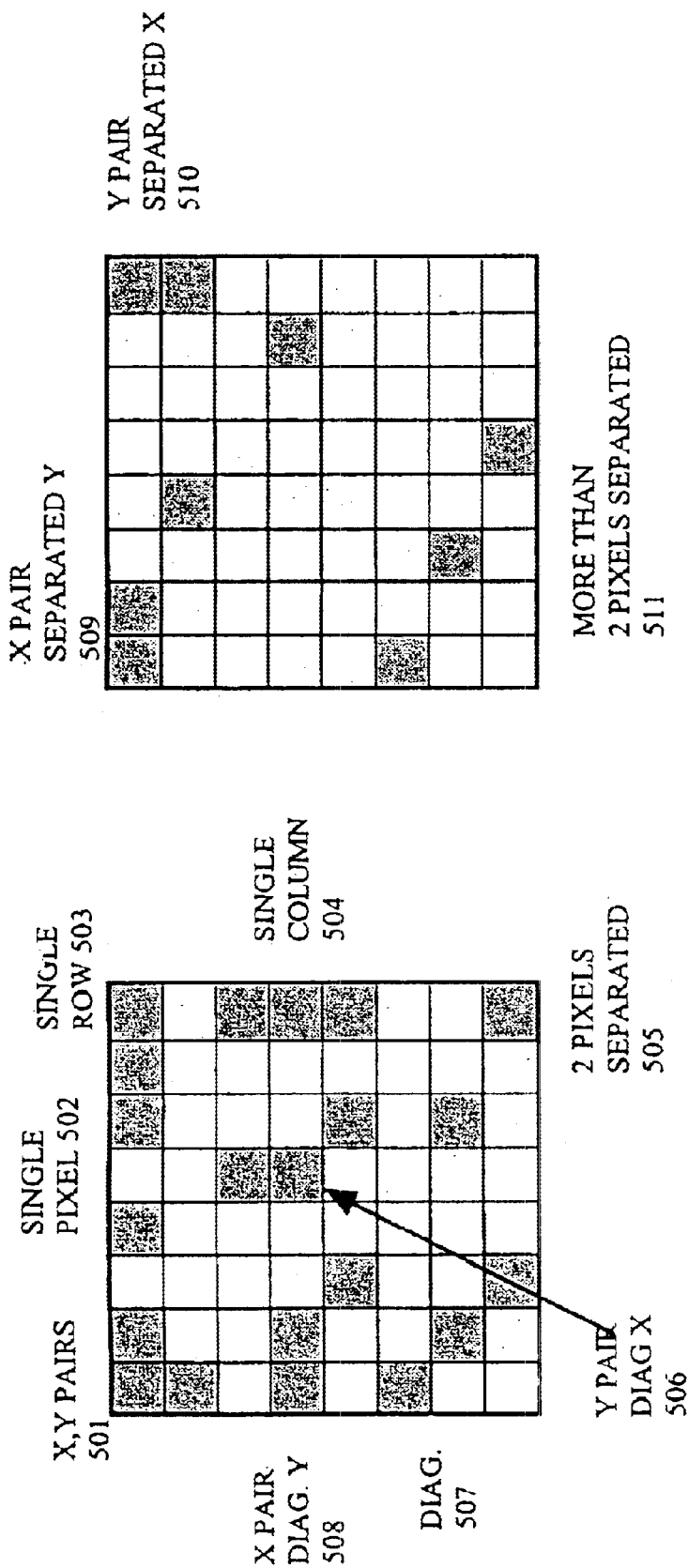

METHOD AND APPARATUS FOR COMPRESSION AND DECOMPRESSION OF Z DATA

BACKGROUND

1. Field of the Invention

This invention relates to the field of image data compression.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Three dimensional graphics processing applications require the storage and processing of large amounts of data. The time it takes to transfer data from memory to a graphics processor can negatively affect the ability to process graphics data. There is a need to improve the ability to quickly transfer graphics data from memory to processor. This problem can be understood by reviewing the way that graphics systems process data.

Computer systems are often used to display generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive (color and depth or "Z" data), and a drawing command. The execution of drawing commands to generate a display image is known as graphics processing.

A limitation of system performance the bandwidth required to transfer data from memory to the graphics processor. Prior art systems do not provide a way to optimize data transfer in a graphics processing system.

SUMMARY OF THE INVENTION

The present invention provides a scheme for compressing the depth, or Z, components of image data. The data is grouped into a plurality of tiles. A test is performed to determine if a tile can be compressed so that its size after compression is less than its size before compression. If so, the tile is compressed. A tile table includes a flag that can be set for each tile that is compressed. In a data transfer from memory to a graphics processor, the tile table is examined to identify those tiles that are compressed and must be decompressed prior to use.

In one scheme the number of primitives that are contained in a tile are determined. If the number of primitives is less than one third of the number of pixels in a tile, an assumption is made that the tile can be compressed. For example, for an 8×8 tile, if the number of primitives is equal to or less than 21, the tile is compressed. In one embodiment, the compression scheme comprises storing a plane equation for each primitive and storing the fragment ID (FID) for each pixel in a primitive.

In another embodiment, a number of compression schemes are available for use on a tile and the best compression scheme is chosen on a tile by tile basis. The invention includes an identifying code for each compression scheme which is accessed on decompression so that the correct decompression scheme is used.

BRIEF DESCRIPTION OF THE DRAWINGS

FIG. 5A illustrates possible pixel configurations.

FIG. 5B illustrates more possible pixel configurations.

DETAILED DESCRIPTION OF THE INVENTION

A method and apparatus for compression of Z image data is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The present invention provides for a compression scheme to reduce the amount of data that needs to be stored in memory. The compressed data can be transferred from memory to processor at a higher bandwidth than uncompressed data, improving performance. The invention also provides for a method of decompressing the data at the processor. The compression scheme of the invention is a lossless scheme so that no image information is lost. The invention operates under the constraints that the compressed image data is less than or equal to the image data uncompressed, and that the bandwidth of transferring the compressed image data is less than or equal to the bandwidth of the uncompressed image data.

Data Organization

The invention organizes color images in 2 dimensional groups of pixels referred to as tiles. In one embodiment, the tiles are 8 pixel by 8 pixel tiles. Other configurations of tiles can be used without departing from the scope and spirit of the present invention.

Tile Compression

The present invention considers each tile to be written to memory as a candidate for compression. The invention determines whether the compression of the tile would save memory or not and processes the tile accordingly. As a result, each individual tile could be compressed or uncompressed. (The compression status of each tile could be stored in the tile itself. However, an uncompressed tile has no available space to indicate it's status as an uncompressed tile. In addition, at least the first word of each tile would need to be read to determine if it is compressed or not, reducing memory efficiency because reading the first word of a tile before making a decision about how many memory words to read would make typical pipelined memory access difficult). To avoid these problems, the present invention includes a means of tracking the compression status of each tile via a Tile Format Table (TFT). The TFT includes an entry for each tile in the table. When the tile is written to memory, its corresponding TFT entry is updated to indicate whether it is compressed or not.

Figure 1:
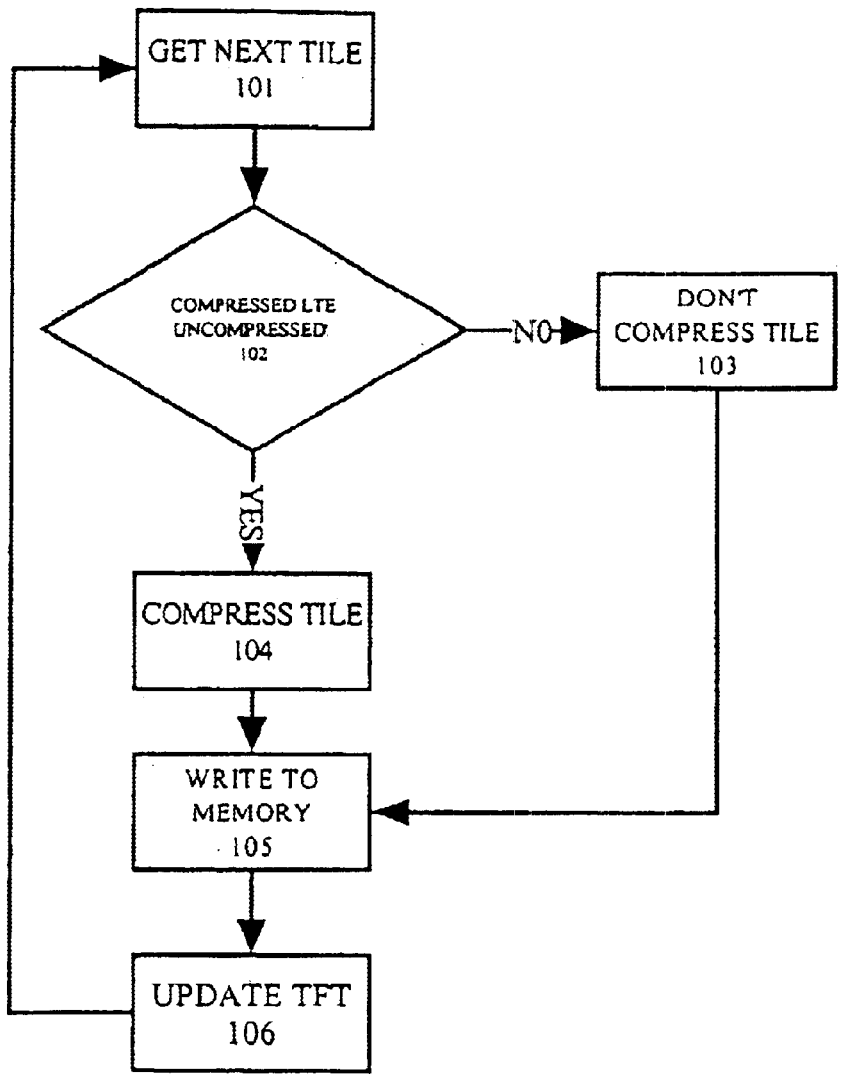
FIG. 1 is a flow diagram illustrating the compression of tiles and updating of the TFT in the present invention.

A flow diagram of the compression of tiles and updating of the TFT in the present invention is illustrated in FIG. 1. At step 101 the graphics processor gets the next tile to be written to memory. At step 102 it is determined if after compression the compressed tile will be less than or equal to the uncompressed tile (i.e. the original tile). If not, the tile remains uncompressed at step 103. If the compressed tile would be less than or equal to the uncompressed tile the tile is compressed at step 104. After either step 103 or 104, the tile is written to memory at step 105. At step 106, the appropriate entry in the TFT is updated to indicate the compressed/uncompressed status of the tile. The system then returns to step 101.

Figure 2:
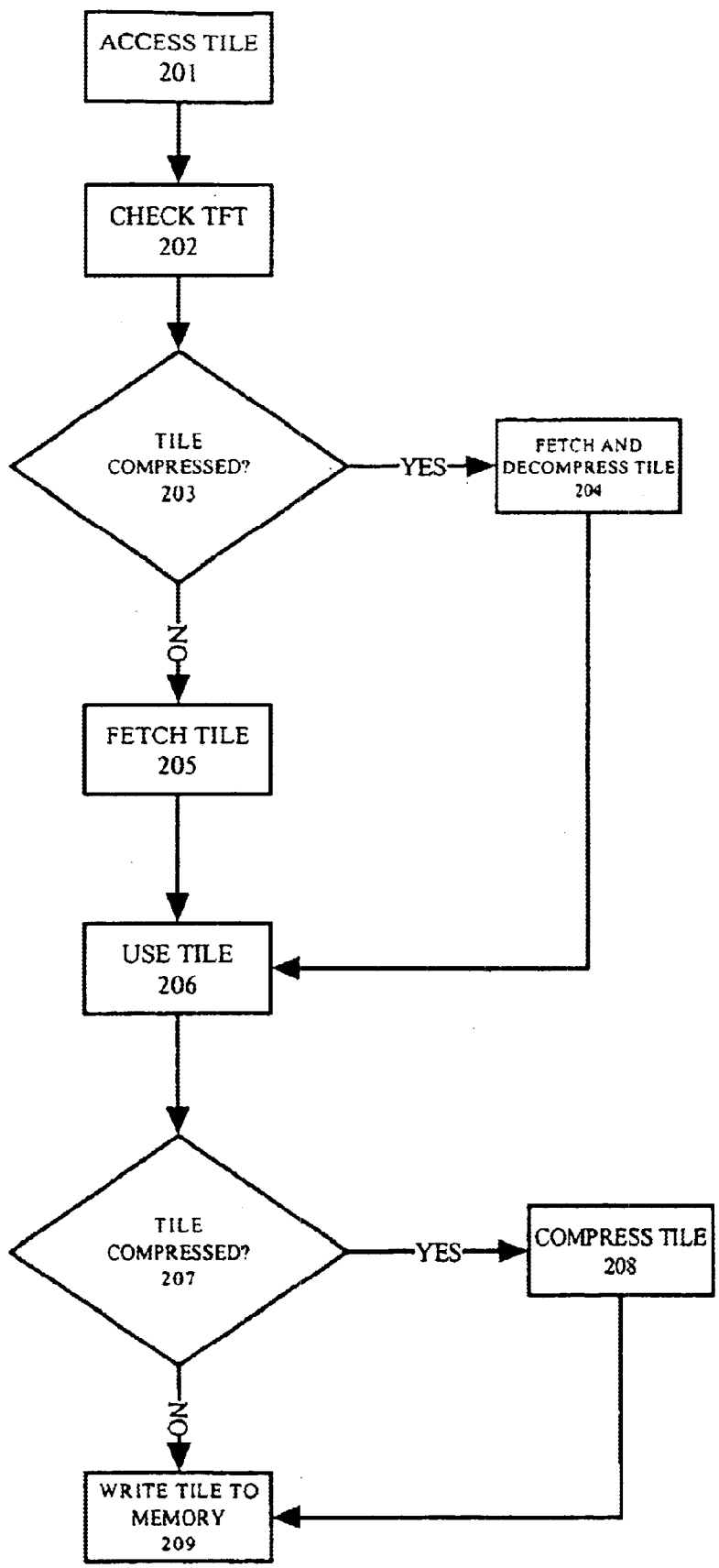
FIG. 2 is a flow diagram illustrating the reading of a tile from memory and the writing back of a tile to memory.

A tile is decompressed into Z pixel data when the tile is read from memory for graphics processing and is compressed when written back to memory. FIG. 2 is a flow diagram illustrating the reading of a tile from memory and the writing back of a tile to memory. At step 201 the tile is accessed from memory. At step 202 the TFT entry for that tile is examined. At step 203 it is determined if the TFT entry indicates a compressed tile. If so, the tile is fetched and decompressed at step 204. If not, the tile is simply fetched at step 205. After either step 204 or 205, the tile is used by the graphics processor at step 206. When writing a tile back to memory, the TFT is again checked at step 207 to see if the tile was a compressed tile. If so, the tile is compressed at step 208. After step 208, or if the tile was not a compressed tile, it is written back to memory at step 209.

TFT Structure

The present invention contemplates the ability to apply different compression schemes to each tile, and for each tile to be compressed to a different number of words. For example, if an uncompressed pixel tile contains 4 memory words, then a compressed tile could be one, two, or three words in length. Correspondingly, the TFT contains a value 1 to 4 for each tile describing the number of words containing the compressed tile (1 to 3 words) or the uncompressed pixel tile (4 words if the tile cannot be compressed into fewer than 4 words).

Other system elements, such as a CPU or I/O controller, which access the compressed images generated by the graphics processor, need to perform decompression and optionally compression. This means that the TFT is a shared system resource. The TFT can act as a shared resource by being multibuffered much like color images are multibuffered, that is, one copy of the TFT accessed by the graphics processor during rendering one image, and another copy of the TFT accessed by other system elements for another image.

Because the number of tiles in a typical image can be large, such as 32K 8×8 tiles in a 2M pixel image, even with only a few compression states stored in the TFT, such as 4 states of valid, 1 or 2 word compressed, uncompressed, in 2 bits per entry, the TFT memory can be significant, (as much as 4K bytes). The TFT itself can be be cached in the graphics processor and maintained in memory to reduce on chip TFT storage. In this case a graphics memory access can update the TFT cache entry from the memory TFT if the tile entry it requires is not in the cache. Updating the TFT cache can be pipelined with graphics processor compression and decompression in conjunction with pipelined memory access. Typically the TFT cache entries are updated on memory read and therefore available for the later memory write of the same tiles. A memory TFT with graphics processor cache also simplifies providing access to the TFT by other system elements, insofar as the memory TFT is accessible by other system elements.

Tile Caching

In a typical implementation, the graphics processor anticipates image tiles that it will process, reads memory words in advance of processing (prefetch), and buffers memory tiles it has completed processing in advance of writing memory words. This pipelining of memory reads, graphics processing, and memory writes allows enough computing time to perform compression and decompression in parallel with processing. One implementation of pipelined memory access and graphics processing is an image cache, in which tiles are cache lines which are read from memory on cache line misses and written to memory on cache line evictions.

Z Compression

The present invention presumes that Z data is stored in a Zbuffer memory. Each tile in the Zbuffer memory can be read out or written as pixels, or in any one of a number of compressed formats (requiring fewer memory words to be accessed). The Z compression scheme of the present invention in one embodiment does not reduce the size of the Zbuffer, only the number of words transferred per Z tile. Compressed tiles reduce Z memory bandwidth in order to make more bandwidth available for other accesses, such as color and display, and thereby increase system throughput.

Simulation results for a software implementation show the following compressed bandwidth as a percentage of transferring uncompressd data (referred to hereas Z pixel bandwidth). Assume a data set that is a torus of around 28K triangles whose average front facing triangle size is indicated. (Only rendered Z tile bandwidth is measured, not background Z tiles which are not modified). For 16b Z values and 16b Z compression.

| average triangle size | compressed bandwidth |
|---|---|
| 100 pixel | 37% |
| 50 pixel | 49% |
| 25 pixel | 68% |

The advantage of the invention is that bandwidth improvement for existing applications is acheived and performance is never worse than an uncompressed Zbuffer. Furthermore, there is a synergy between compressed Z and Z caches in that areas of high geometric complexity (small polygons) benefit from the multiple hit write combining performance of the Z cache even if tiles don't compress, and areas of low geometric complexity (big polygons) compress well even if cache line pixels are only written once per miss and eviction. Because the compression is based on pixel masks, functions like alpha threshholding and virtual intersections can also be compressed. A secondary advantage of Z compression is that translucent pixels that test but don't update Z do not decrease the amount of Z compression, so effects like particles, smoke, shadows, weapons flares, etc. which blend on top of opaque Z buffers can have unlimited geometric pixel complexity without increasing Z bandwidth.

Block Diagram

Figure 3:
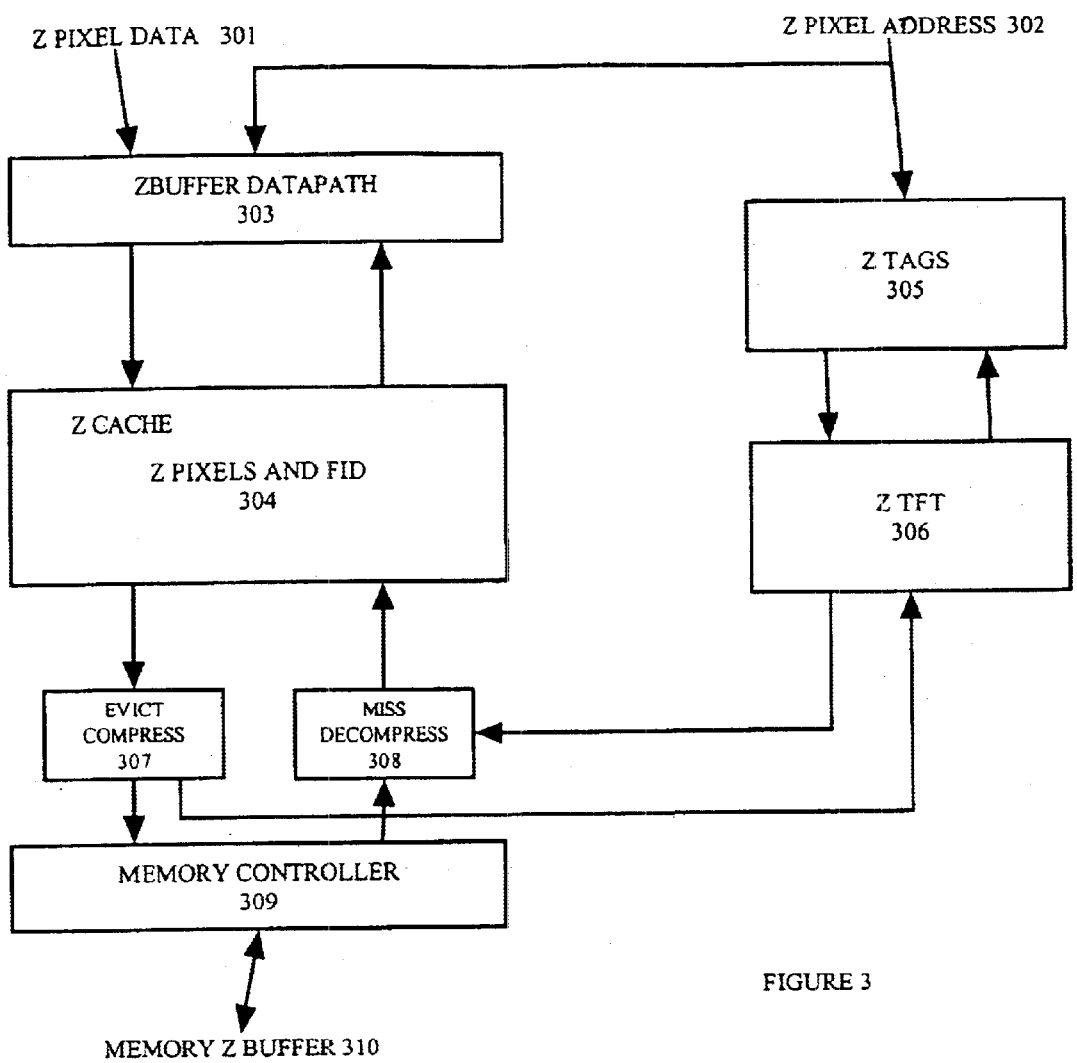
FIG. 3 is a block diagram of the present invention.

A block diagram of the present invention is illustrated in FIG. 3. This embodiment of the invention presumes that the Z tiles are cached. Z tiles in the Z buffer are either compressed or decompressed, but the Z tiles in the cache are all decompressed. Bandwidth savings occur in the transfer of compressed tiles between the cache and the buffer. Compressed tiles that are received from the buffer to the cache are decompressed before writing to the cache. (This transfer only occurs on a cache miss and when the transferred tile was already compressed. Uncompressed tiles from the buffer are simply written through to the cache.) Z tiles that are evicted from the cache and written back to the buffer are compressed (when appropriate) before being transferred to the buffer.

Referring to FIG. 3, Z pixel data 301 is provided to the Zbuffer datapath 303 along with Z pixel address data 302. Z pixel address data is also provided to Z tags 305. The Z buffer datapath communicates the Z pixel data 301 and Z pixel address data 302 to the Z cache 304 which stores Z pixels and additional data referred to as FID (fragment ID). The FID is the count of all triangles which write the tile. The FID is used to reconstruct the plane equation from pixels from the same triangle.

Z addresses are checked to see if the tile resides in the cache. If so, the system can use the resident Z tile. If the Z tile is a "miss", i.e. it is not in the cache, it must be obtained from the Z buffer 310. When that occurs, memory controller 309 retrieves the desired tile from Z buffer 310 and pro9vides it to the Z cache 304 via Miss/Decompress block 308. The TFT entry for the missed tile is checked and if necessary (meaning if the tile is already compressed), the tile is decompressed and provided to the Z cache 304. Z TFT memory 306 communicates with the Z tags block 305. The Z tags block 305 is used to check for cache hits and misses as described in U.S Pat. No. 6,490,652 entitled "Method and Apparatus for Decoupled Retrival of Cahee Miss Data", issued Dec. 3, 2002. In the present invention, the tags include a fragment count (FCNT) for each cache line, used to generate the FID per pixel.

The Z TFT 306 contains the status of every tile in the memory Z buffer. The TFT 306 is read during a cache miss to determine if the line is compressed or not, how many memory words to read, and if and how to decompress the tile. The TFT 306 can also contain a Background format per tile, so that for Z buffer clear only the TFT and not the memory needs to be initialized.

The TFT 306 is written by the evict/compress block 307 after a tile is evicted from cache, based on if and how the tile is compressed. The evict/compress block 307 gets the tile being evicted from cache 304 and tries to compress it based on the pixel FIDs and the Z values. Tiles which can't be compressed are simply written to memory as pixel tiles. The miss/decompress block 308 writes missed tiles into cache, writing the Z values and FIDs, and decompresses compressed tiles or simply writes pixel tiles to cache. The TFT entry 306 for the tile is updated as to whether the tile is compressed or not.

The present invention provides for increased or faster bandwidth on transfers of Z data between the Z cache and the Z buffer. This improved transfer capability improves overall performance of the graphics system.

Zbuffering

When a line is written into the cache on a miss, the tag status FCNT in block 305 is set to the number of fragments in a compressed tile, or zero for a pixel (uncompressed) tile (if pixel format cache lines support the FCNT). The FID of each pixel in the cache tile is set to the fragment number which created it for a compressed tile, or FIDMAX for a pixel tile. FIDMAX is a particular FCNT (e.g. 15 for a 4$b$ FCNT and FID) which indicates that more fragments have written the tile than can be counted, and compression cannot be performed, since the FIDs may no longer be unique per fragment. For background tile misses, the pixel FIDs are set to zero, the FCNT to 0, and the Z pixels are written with the background Z value.

The first pixel for a primitive for a tile which writes Z increments the tag status FCNT for that tile, and each pixel in the primitive that writes Z writes the incremented FCNT into the pixel FID. This method implies that each cache tile is visited once per primitive, that is, all the pixels of a primitive for a tile arrive before pixels of any other tile. This may be done by rasterizing in 8×8 tiles. The FCNT is larger (maximum 15 fragments) than can be compressed (maximum of 6 to 8 fragments) because it is common that more fragments will be written to a tile than are visible, for example, a new primitive overwrites all the pixels of a previous primitive in the tile. The Zbuffer path never sees the entire tile at one time, so there must be extra FIDs for the new pixels so that the evict/compress path 307 can find the actual fragments in the tile later.

FID and FCNT Logic

If miss if pixel tile, FCNT=0, FID=FIDMAX (no fids in the tile)
if compressed tile, FCNT=fragment count, FID=pixel mask fid
if background tile, FCNT=0, FID=0 (one fragment of background Z)

If hit

If new primitive and first Z write and FCNT<FIDMAX, FNCT++
If Z write, FID=FCNT (A further constraint on the rasterizer which generates Z values is that the dxz and dyz terms used to generate pixel Z values within a tile should be the same precision as the compressed Z plane equation terms, in order to insure lossless compression).

Tile Format Table

The TFT contains an entry for each tile in the memory Zbuffer. For 8×8 tiles in a 2M pixel Zbuffer, this is 32K entries. Each entry is a 2 bit value encoded as 00 background tile
01 pixel tile
10 compressed 1 word
11 compressed 2 words The results in a 64K bit or 8KB table. A maximum 1280 image could reduce it to 5 KB. (Note that more than 2 compression formats, such as for 24 or 32$b$ Z buffering, where more memory words are needed to store an uncompressed Z tile, would require more bits or elimination of the background format).

The TFT is read on a miss to figure out how many words to read from memory (0,1,2,4) and whether to decompress the tile. The compression format has to stay in the miss queue for the miss/decompress path 308 to use when the memory word(s) eventually show up.

The TFT 306 is written by the evict/compress path 307 once it has processed a tile. (Note the TFT 306 could itself be a cache).

Compressed formats

The compressed tile formats contain the plane equation of each fragment generated from pixel differences in the tile, and a pixel mask of theFID of each pixel generated from the cache pixel FID 304. The pixel location of the pz term is implicit, being the first (such as upper left) pixel of its fragment in the tile. All other pixels in that fragment are generated by their offset times dxz dyz from the first pixel. This means no additional information besides the plane equations and FID masks are needed.

Some compressed formats for 8×8 so far are as follows:
16$b$ Z format
16$b$ pz, dxz, dyz or 6B per plane equation per fragment
32B, 3 fragment plus 14B mask, encoded 7$b$ per 4 pixels of 3 fids
64B, 6 fragment plus 24B mask of 3 bits fid per pixel
(128B, 64 16$b$ pixels)
24–32$b$ Z format
24 or 32$b$ pz, dxz, dyz or 9 or 12B per plane equation per fragment
32B, 2 fragments plus 8B mask of 1 bit fid per pixel
64B, 4 fragments plus 16B mask of 2 bit fids per pixel
96B, 6 fragments plus 24B mask of 3 bit fids per pixel (8 frags if 24$b$)
plus 32B stencil of 64 8$b$ pixels if needed
(256B, 64 32$b$ pixels, or possibly 192B of 24$b$ pixels)

Note that the maximum number of compressed fragments determines the size of the compress and decompress paths. Fewer fragment formats than the maximum are essentially free since they reuse the maximum fragment paths.

Compression Path

Compression occurs in the evict write path 307 from the cache 304 into memory 310. After the tile is processed, the compression path updates the TFT 306 with the status of the tile.

The plane equation of each fragment is computed by subtracting Z values in X and Y of pixels of the same FID. (Note, in one embodiment only pixels whose tile coordinates differ in X and Y by 1, 2, or 4 are candidates for Z subtraction, because differences of 3,5,6, or 7 would require a division instead of a shift to get the dxz and dyz terms, which is expensive and can introduce truncation error.)

Compression can fail (be unwarranted or not satisfy the constraints noted above) for several reasons. Compression failures include more fragments than can fit in a compressed format, any pixel whose FID is FIDMAX, which means that FCNT has overflowed and pixels may not be unique to a fragment, or if plane equation terms cannot be computed as discussed below. If compression fails (i.e. is not practical), the tile is written to memory as a pixel tile.

Figure 4:
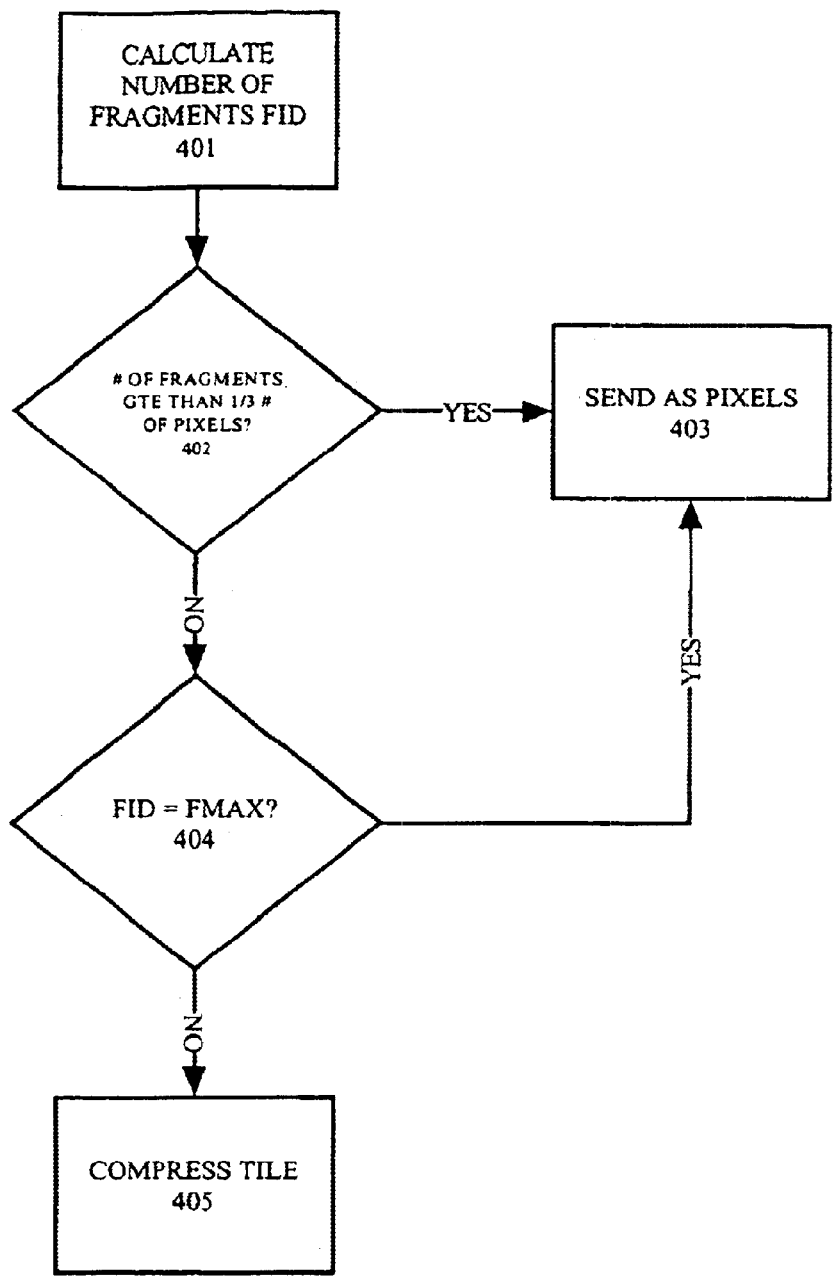
FIG. 4 is a flow diagram illustrating the examination of a tile for possible compression.

FIG. 4 is a flow diagram illustrating the examination of a tile for possible compression. At step 401 the number of fragments in the tile is determined and the FID for the tile is generated. At step 402 it is determined if the number of fragments is greater than or equal to one third the number of pixels in the tile. If the number of fragments is greater than or equal to the number of pixels, compression is presumed to not be efficient and the tile is sent as pixels at step 403. The FID is also checked to see if it is equal to FMAX at step 404. If it is equal, the tile cannot be compressed and the tile is sent as pixels at step 403. Otherwise the tile is compressed at step 405.

If all pixels of each fragment had a pair of adjacent pixels in X and a pair of adjacent pixels in Y, computing the plane equation fragment would be straightfoward, with pseudo code such as:
for each pixel in the tile at this FID
if first pixel store PZ
if adjacent pair in X, subtract and store into DXZ
if adjacent pair in Y, subtract and store into DYZ The FID mask for the tile is examined to find the first pixel and the adjacent pairs. This condition is true for many fragments, however as geometric complexity increases, this condition is often not true.

For example, FIGS. 5A and 5B illustrate some possible pixel configurations. Some pixels are found in X,Y pairs such as pairs 501 or as single pixels 502. The pixels may also be in single rows in X 503 or Y 504. There may be an X pair with diagonal Y 508 or Y pair with diagonal X 506. There could be a diagonal 507 or 2 pixels separated 505. There could also be an X pair with separated Y 509, a Y pair with separated X 510, or more than two pixels separated 511. Some examples of fragment pixel plane equation configurations, and their occurrence as a percentage of total fragments in a simulation of average 25 pixel triangles in an 8K triangle torus follows.

67% adjacent xy pairs 501.
15% single pixel 502: dxz and dyz are can be zero.
13% single row 503 or column 504: dxz or dyz can be zero.
2% adjacent x or y pair and diagonal (506, 508), can generate dx or dy
2% diagonal 507: diagonal delta (dxyz) can be used for dxz, and dyz can be zero.
1% 2 pixels separated 505 by X or Y 1,2,4
0.5% adjacent x or y pair (509 or 510), first and another pixel separated by x or y 1,2,4
? adjacent x or y pair, two pixels separated by x or y 1,2,4 (not implemented)
? more than 2 pixels separated 511 by x or y 1,2,4 (not implemented)

Since more complex configurations of fragments usually have few pixels, they tend to occur in tiles with a many fragments. A useful measure is how many tiles which were compressed included these configurations, that is, what percentage of compressed tiles would have failed without these configurations, again with the same average 25 pixel 8K triangle torus.

41% single pixel 502
35% single row 503 or column 504
6% adjacent x or y pair and diagonal (506, 508)
3% diagonal 507
1% 2 pixels separated 505
0.5% adjacent x or y pair, first and another pixel separated 509, 510
2% other configurations (not compressed)

The 2% other configurations are multiple seperated pixels 511 and pixels seperated by 3,5,6,7 for which lossless plane equations cannot be easily generated and compression fails. In this simulation 68% of the tiles compress, 30% have too many fragments to compress, and the remaining 2% are the other configurations.

The fragment pixels separated by more than 1 pixel usually occur from sliver triangles (triangles thinner than a pixel) which only intermittently include a pixel center.

To compress fragments with separated pixels, a larger window in the FID mask must be examined. The size window in which the FID mask is examined adds to complexity and latency. For example, looking for pairs of pixels separated by 1 pixel needs a smaller window, and can be more easily pipelined, than looking for pairs of pixels separated by 2 or 4. It appears that the 2 or 4 separated cases are rare enough to be not worth the complexity, although this might change with more simulation. There is a typical balance, however, that as more sliver triangles touch a tile, the fragment count also typically increases to where the tile could not be compressed anyway. Effects like textured alpha thresholding (screen door transparency) would increase the likelihood of separated pixels in fragments.

If the cache output rate is 8 16*b* pixel Zs and 8 pixel FIDs, then reading an 8×8 tile from cache takes 8 clocks. Compression could have throughput of 8 clocks, consisting of a number of stages equal to the maximum compressed fragments, for example 6 stages. Each stage would examine the input FID mask and acquire the first occurrence of an FID, and pass on a valid mask of the pixels not matching that FID.

The valid mask is a single bit per pixel. If the valid masks contain valid pixels after the last stage, the maximum fragment count has overflowed and the tile can't be compressed. Each stage also keeps a bit mask of pixels which match its FID in order to detect pairs of pixels for plane equation differences. Each stage also updates an output FID mask, consisting of the pixels the stage matched, and whose new FID is the number of the stage (0 to 5). This remaps fragment FIDs into the minimum number of fragments in the tile, since some fragments may have been completely overwritten during Z buffering.

Each stage also examines the input bit mask for pairs of pixels which match its FID in X, Y, or diagonally. Each stage stores up to 5 Z values, consisting of the first Z pixel (pz of the plane equation), X left, X right, Y top, and Y bottom. Diagonally pairs can write the X or Y pairs if X or Y pairs have not been written, and then be overwritten by later X or Y pairs. Since pairs of pixels often cross 8 pixel cache words, it seems better to examine the bit masks 3 or 4 clocks ahead of selecting Z pixels, by pipelining the Z data for 3 or 4 clocks behind the mask processing, than to need to select Z values at each stage from multiple cache words. Most likely the 8 pixel cache words are organized as 4×2 pixels (2 2×2 quads). This means that keeping 4 bitmasks allows the encoding of pixel pairs in the current bit mask or in the last row or column of the previous three bitmasks. Pixel pairs that are detected in the bit masks are used to select and store the incoming Z pixels in the XL,XR,YU,YB registers for later subtraction to generate dxz and dyz. The first 3 mask cycles can simply have bitmasks of zero for the nonexistent previous masks. Detecting pixel pairs separated by 2 would increase previous row and column mask window by 1, and detecting separations of 4 would increase by 3.

Each stage also maintains various pixel counts, in order to detect single pixels, single rows or columns, or single diagonals. These counts can be 2 bits since only 0, 1, 2 or many needed to be counted. Diagonal detection can be relative to the base pixel coordinate, in that all pixels in subsequent rows must be at the pz X coordinate +or the row offset.

After all the tile data has passed a stage, the plane equation can be generated from the fragment by subtracting X pairs and Y pairs (or the various special cases). A stage then decides if the pixel configuration of its FID can generate the appropriate plane equation terms. If not, the tile cannot be compressed. With a maximum of 8 or less fragments and a cache tile read rate of 8 clocks, the plane equation term subtraction can occur for 1 fragment in 1 clock, and be then pipelined for all the fragments.

The latency through the compression path might be on the order of 4 clocks for 4 masks to start first stage
8 clocks for data past the first stage
6 clocks for data past the last stage
2 clocks for final output decisions
20 clocks total latency per tile while throughput is sustained at the 8 clock per tile cache data rate. In order to keep the memory occupied during eviction, at least 3 tiles (20 clocks of latency at 8 clocks per tile) should be in the evict path to be ready to write memory. The evicted pixel tile is buffered in a FIFO during compression, and when compression fails the pixel data is written to memory instead of the compressed tile data.

The control logic for compression might look something like the following pseudocode. The first stage sees a validmask all valid, and so always sets its stage_fid to the first pixel inputFID.

If !stage_active
   priority encode first inputFID not FIDMAX at validmask bit
   stageFID=first valid FID
   stage_active=true
   pz=z at first valid FID pixel, when the Z data word comes along
      bitmask=1 if inputFID==stageFID, else 0
      validmask &=~bitmask
      outputFID=outputFID &~bitmask|stage_number & bitmask
The X and Y values are captured like
for most recent 4 bitmasks (current, last row, last col, last pixel)
   priority encode location first pair of X pixels
   priority encode location of first pair of Y pixels
   priority encode location of first pair of diagonal pixels
   if X pair inactive and X pair
      select XL, XR when Z data word(s) comes along
      set X pair active
   if Y pair inactive and Y pair
      select YU, YD when Z data word(s) comes along
      set X pair active
   if X pair inactive and diag pair
      select XL, XR when Z data word(s) comes along
      set diag pair active
   if Y pair inactive and diag pair
      select YU, YD when Z data word(s) comes along
      set diag pair active
The various configurations are tracked along the lines for each bit in the bitmask, inc pixel count (up to >2)
for each row in the bitmask, inc row count (up to >1)
for each col in the bitmask, inc col count (up to >1)
   need to keep track of at least 1 previous column X coord and compare if any bitmask pixel not on the pz pixel diagonal, diag= FALSE The plane equation is generated for a fragment:

If Xpair and Ypair subtract those
If pixelcount==1 dxz, dyz zeroed
If rowcount==1 and Xpair, subtract XLXR and zero dyz
If colcount==1 and Ypair, subtract YUYD and zero dxz
If diag and Dpair, subtract XLXR and zero dyz
If Xpair and Dpair, subtract XLXR, subtract YUYD dxz
If Ypair and Dpair, subtract YUYD, subtract XLXR dyz
  (need to keep the X direction of the diagonal for the X subtact)
If other more complicated configurations . . .
else compress=FALSE The final output logic looks at If any stage active and !compress, then output pixel tile
If validmask not all invalid, pixel tile (includes FIDMAX FIDs)
else compression format is count of active stages up to 3 or 6 or max frags
If format is 3 fragment 16b Z, encode mask FID to 7b per 4 pixels.
Update TFT tile with output format
Decompression Path Decompression occurs in the miss decompression path 308 from memory (Z buffer 310) into the cache (304). The TFT 306 entry for the memory tile tells the decompression path what to do with the tile.

For each pixel Z in each tile, the plane equation terms of the fragment specified in the mask of that pixel are added to produce the Z value. The first pixel for each fragment in the tile is the base pixel, whose coordinates within the tile are retained in order to generate the distance in X and Y to each pixel of that fragment in the tile, and that distance is multiplied by the plane equation dxz and dyz coefficients to generate the Z value for that pixel. In addition, the pixel FID in the tile is written to the FID of the pixel in the cache. In pseudo code Decode 7b/4pixel/3frag/16bZ mask if needed.
  For each FID in the tile
    If first pixel of that FID then BX, BY=base tile coordinate
    For each pixel of that FID, PX, PY=pixel tile coordinate
    CacheZ=PZ[FID]+DXZ[FID]*(BXPX)+DYZ[FID]*(BYPY)
    CacheFID=FID
  TagFCNT=maximum FID in the tile For 16b Z values and a 128B cache Z word, 8 Z pixels are decompressed per clock. For compressed tiles with a maximum of 6 fragments, each pixel selects 1 set of plane equation terms out of six, and one set of base tile coordinates.

The entire compressed tile needs to be available before decompression can begin, since one of the first 8 pixels can come from any of the fragment plane equations. Since tiles are 8×8, tile coordinates are 3 bit numbers, so the multiplies can be implemented with 3 adders which shift delta terms by 0,1,2.

The tile FIDs should be compared to find the maximum FID to update the tag FCNT, because a tile will often contain fewer fragments that the maximum of that compressed format. The compression path generates FIDs consecutively from 0 for each fragment.

Related schemes for compressing Z informatio are found in co-pending patent applications (assigned to the assignee of the present invention) 1) Method and Apparatus for Controlling Compressed Z information in a Video Graphics System filed Aug. 6, 1999, Ser. No. 09/369,730; 2) Method and Apparatus for Compressing Parameter Values for Pixels in a Display Frame filed Sep. 1, 1999, Ser. No. 09/387,870; and 3) Method and Apparatus for Controlling Compressed Z information in a Video Graphics Ssytem that Supports Anti-Aliasing filed Jul. 20, 1999, Ser. No. 09,356,790; all incorporated herein by reference.

Thus, a method and apparatus for compression and decompression of Z data is described.

I claim:

1. A method of compressing data in a graphics processing system comprising:
  defining a plurality of tiles of data;
  defining a tile format table containing a status entry for each of said plurality of tiles;
  identifying the number of primitives contained in a tile;
  compressing said tile by storing said data in a plane equation format when said compressed tile is smaller than said tile;
  setting said status entry for said compressed tile in said tile format table; and
  storing said compressed tile in a memory.

2. The method of claim 1 wherein a tile is compressed when said tile has a number of primitives less than or equal to ⅓ of the number of pixels in said tile.

3. The method of claim 1 wherein said compression is lossless.

4. The method of claim 1 wherein each of said tiles comprises a cache line.

5. The method of claim 4 wherein pixels in said tiles represent Z data.

6. The method of claim 5 wherein said step of compressing comprises:
  storing a plane equation for each primitive in said tile, wherein each primitive has a fragment ID number; and
  storing a fragment ID with each pixel in each said primitive.

7. The method of claim 6 wherein said plane equation of pixels is computed by:
  using the Z value of a first pixel as a first term of said plane equation;
  subtracting X values of adjacent pixels in X that have the same fragment ID number to obtain a second term; and
  subtracting Y values of adjacent pixels in Y that have the same fragment ID number to obtain a third term.

8. The method of claim 2 wherein tiles read from said memory are decompressed when said status bit indicates that said tile is a compressed tile.

9. A graphics processing system comprising:
  a first memory for storing a plurality of tiles of data;
  a second memory for storing a tile format table containing a status entry for each of said plurality of tiles; and
  a compression system coupled to said first and second memories for compressing by storing said data in a plane equation format said tile when said compressed tile is smaller than said tile, for setting said status entry for said compressed tile in said tile format table, and for storing said compressed tile in a memory.

10. The graphics processing system of claim 9 wherein a tile is compressed when said tile has a number of primitives less than or equal to ⅓ of the number of pixels in said tile.

11. The graphics processing system of claim 9 wherein said compression is lossless.

12. The graphics processing system of claim 9 wherein each of said tiles comprises a cache line.

13. The graphics processing system of claim 12 wherein said pixels in said tiles represent Z data.

14. The graphics processing system of claim 13 wherein said compression system compresses by storing a plane equation for each primitive in said tile, wherein each primitive has a fragment ID number, and storing a fragment ID for each pixel in each said primitive.

15. The graphics processing system of claim 14 wherein said plane equation of pixels is computed by:

using the Z value of a first pixel as a first term of said plane equation;

subtracting X values of adjacent pixels in X that have the same fragment ID number to obtain a second term; and subtracting Y values of adjacent pixels in Y that have the same fragment ID number to obtain a third term.

16. The graphics processing system of claim 11 wherein tiles read from said memory are decompressed when said status bit indicates that said tile is a compressed tile.

17. A method of caching pixel data comprising:

storing pixel data in a plurality of tiles in a cache;

storing pixel data in a plurality of compressed tiles in a memory; and decompressing a compressed tile of pixel data from said memory into said cache on a cache miss, wherein a fragment count number indicating the number of fragments in said compressed tile is recorded and a fragment ID number of each pixel in said tile is set to the fragment count number of the fragment which created said pixel.

18. The method of claim 17 further comprises the step of:

writing Z data for a new primitive in a tile in said cache, wherein said fragment count number is incremented and pixels of said new Z data receive said incremented fragment count number as their fragment ID number.

19. The method of claim 18 further comprises the step of: evicting a tile by compressing said tile, said step of evicting further comprises:

compressing said tile by storing said data in a plane equation format when said compressed tile is smaller than said tile using the Z value of a first pixel as a first term of said plane equation;

extracting values of pixels in X that have the same fragment ID number to obtain a second term; and extracting values of pixels in Y that have the same fragment ID number to obtain a third term.

20. The method of claim 18 wherein said step of decompressing further comprises:

optionally decoding fragment ID mask that accompanies said compressed tile;

picking a first pixel of a first fragment ID and saving said coordinate of said first pixel as a base tile coordinate;

using a plane equation to determine the Z values for all pixels with said first fragment ID; and repeating steps of picking and using for all fragments in said compressed tile.

21. A pixel data cache comprising:

a cache storing pixel data in a plurality of tiles;

a memory component storing a plurality of compressed tiles whereby a compressed tile of pixel data from said memory component is decompressed into said cache on a miss, wherein a fragment count number indicating the number of fragments in said compressed tile is recorded and a fragment ID number of each pixel in said tile is set to the fragment count number of the fragment which created said pixel.

22. The cache of claim 21 wherein said cache is configured to write Z data for a new primitive in a tile in said cache, wherein said fragment count number is incremented and said pixels of said new Z data receives said incremented fragment count number as their fragment ID number.

23. The cache of claim 22 wherein said cache is configured to evict a tile by compressing said tile, wherein said tile is checked to determine if said tile is a good candidate for compression into a plane equation format and said cache is configured to use the Z value of a first pixel as a first term of said plane equation, extract values of pixels in X that have the same fragment ID number to obtain a second term; and extract values of pixels in Y that have the same fragment ID number to obtain a third term.

24. The cache of claim 22 wherein said cache is configured to decompress by optionally decoding fragment ID mask that accompanies said compressed tile, picking a first pixel of a first fragment ID and saving said coordinate of said first pixel as a base tile coordinate, using a plane equation to determine the Z values for all pixels with said first fragment ID, and repeating steps of picking and using for all fragments in said compressed tile.

* * * * *